R. B. MITCHELL.
Plow.
No. 209,412.      Patented Oct. 29, 1878.
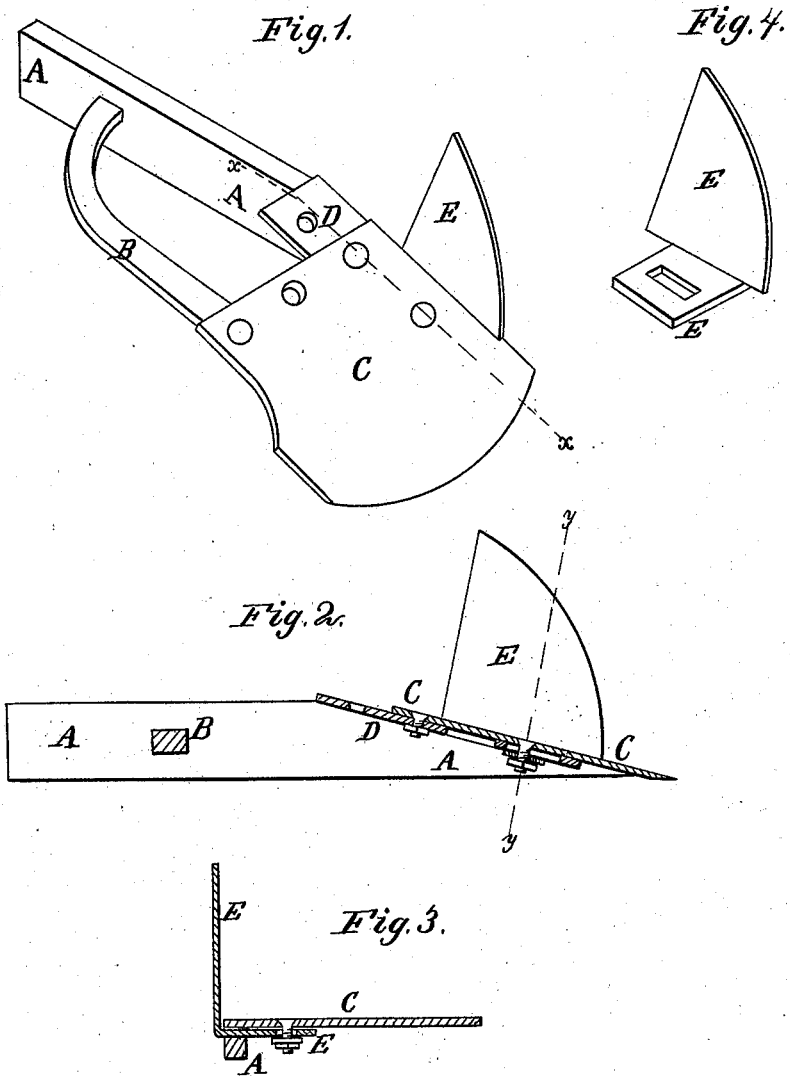

UNITED STATES PATENT OFFICE.

ROBERT B. MITCHELL, OF MINNEAPOLIS, KANSAS.

IMPROVEMENT IN PLOWS.

Specification forming part of Letters Patent No. 209,412, dated October 29, 1878; application filed August 20, 1878.

*To all whom it may concern:*

Be it known that I, ROBERT BOWER MITCHELL, of Minneapolis, county of Ottawa, State of Kansas, have invented a new and Improved Plow, of which the following is a specification:

Figure 1 is a perspective view of the bar, brace, share, and cutter of a plow illustrating my invention. Fig. 2 is a detail longitudinal section of the same, taken through the line $x$ $x$, Fig. 1. Fig. 3 is a detail cross-section of the same, taken through the line $y\ y$, Fig. 2. Fig. 4 is a detail perspective view of the cutter.

Similar letters of reference indicate corresponding parts.

The object of this invention is to improve the construction of sod, stirring, and other plows in such a way that the cutter may be moved forward as it is worn or ground off, that it will prevent roots, grass, and other trash from gathering upon the share, and that it will be free from side draft.

The invention consists in the bar provided with a notch in its beveled edge beneath the share, to receive the flange of the cutter; in the cutter provided with a flange upon its lower end, having a slot formed in it to receive the fastening-bolt, in combination with the notched bar and the share, as hereinafter fully described.

A represents the bar of the plow, and B represents the brace that supports the outer part of the share and mold-board. The bar A is connected with the plow-stock in the usual way, and its forward end is beveled off upon its upper side to receive the share C, which is welded to it. To the rear part of the bevel of the bar A is welded a flange, D, which underlaps the rear inner corner of the share C, and is designed to receive and support the forward inner corner of the mold-board. The flange D has two or more holes formed through it to receive the bolts by which it is secured to the share and the mold-board. The rear outer corner of the share C is bolted to the brace B, and its forward edge is curved upon the arc of a circle, or nearly so, and in such a way that it will be drawn squarely against the soil, so as to prevent all side draft. The curvature of the edge of the share C also causes it to cut off roots, &c., more easily and surely, and prevents roots, grass, and other trash from gathering upon it. E is the cutter, which has an inwardly-projecting flange formed upon its base to enter a notch formed to receive it in the beveled edge of the bar A beneath the share C. The flange of the cutter E is slotted to receive the bolt by which it is secured to the share C, so that by loosening the nut of the said bolt the said cutter may be moved forward as its forward edge wears or is ground off.

The flange of the cutter E, when new, may be made of such a size that its forward edge will rest against the forward shoulder of the notch in the bar A, in which case the forward edge of the said flange must be ground off when the cutter is to be moved forward. The land-side edge of the share C is rabbeted to receive the upright part of the cutter E, said rabbet being made of such a depth that the land-side edge of the forward part of the share and the land-side side of the cutter E may be flush with each other. The cutting-edge of the cutter E may be upright or inclined, straight or curved, as may be desired.

With this construction the cutter E, when not required for use, may be detached and laid aside, and again attached when required.

Having thus fully described my invention, I claim as new and desire to secure by Letters Patent—

1. The bar A, provided with a notch in its beveled edge beneath the share C, to receive the flange of the cutter E, substantially as herein shown and described.

2. The cutter E, provided with a flange upon its lower end, having a slot formed in it to receive the fastening-bolt, in combination with the notched bar A and the share C, substantially as herein shown and described.

ROBERT BOWER MITCHELL.

Witnesses:
 JULIUS O. FISCHBEIN,
 JAMES JOSLIN.